US005139846A

United States Patent [19]

Herwegh et al.

[11] Patent Number: 5,139,846

[45] Date of Patent: Aug. 18, 1992

[54] TWO-PIECE SEALING STRIP FOR SEALINGLY FRAMING A WINDOW PANE, OR A PANEL ELEMENT WITHIN A FRAME

[75] Inventors: Norbert Herwegh, Schattdorf; Max Eigenheer, Altdorf, both of Fed. Rep. of Germany

[73] Assignee: Dätwyler AG Schweizerische Kabel Gummi-und Kunststoffwerke, Altdorf, Switzerland

[21] Appl. No.: 536,684

[22] PCT Filed: Nov. 16, 1989

[86] PCT No.: PCT/CH89/00201

§ 371 Date: Jul. 9, 1990

§ 102(e) Date: Jul. 9, 1990

[87] PCT Pub. No.: WO90/05825

PCT Pub. Date: May 31, 1990

[30] Foreign Application Priority Data

Nov. 18, 1988 [CH] Switzerland ........................ 4287/88

[51] Int. Cl.⁵ ................................................ B32B 3/00

[52] U.S. Cl. .................................... 428/119; 428/192; 428/426; 52/769; 52/770; 52/773; 52/775; 296/84.1; 296/93; 73/523; 73/528; 474/15; 474/16; 474/38

[58] Field of Search ................ 428/57, 119, 192, 426; 474/15, 16, 38; 296/84.1, 93; 52/769, 770, 773, 775; 73/523, 528

[56] References Cited

U.S. PATENT DOCUMENTS 3,487,601 1/1970 James .................................. 52/773

FOREIGN PATENT DOCUMENTS 0251765 1/1988 European Pat. Off. .
1908567 9/1969 Fed. Rep. of Germany .
2166618 10/1974 Fed. Rep. of Germany .
G8900328 4/1989 Fed. Rep. of Germany .
703873 2/1954 United Kingdom .
750252 6/1956 United Kingdom .
2142685 1/1985 United Kingdom .

*Primary Examiner*—Patrick J. Ryan
*Assistant Examiner*—Kam Lee
*Attorney, Agent, or Firm*—Frishauf, Holtz, Goodman & Woodward

[57] ABSTRACT

The sealing strip has a main part (1') with a first sealing lip (6) for making sealing contact with a pane (7) or a filling element. The pane (7) is placed against the sealing lip (6) during assembly and rests on the top (10) of a lip (9'). A recess (13') is provided in a bridge (4') in the body of the sealing strip. The foot or base (16') is a second part (2'), which carries a second sealing lip (15') in contact with the other side of the pan (7'), fits into the recess. When the foot (16') is inserted into the recess (13'), the two sealing lips (6'15') are elastically deformed and pressed against the pane (7'). The inserted foot has a groove (19, 22) at one end in which a rib (14') engages. The foot (16') and hence the part (2') are thus firmly anchored in the main part (1').

20 Claims, 1 Drawing Sheet

Figure 1:
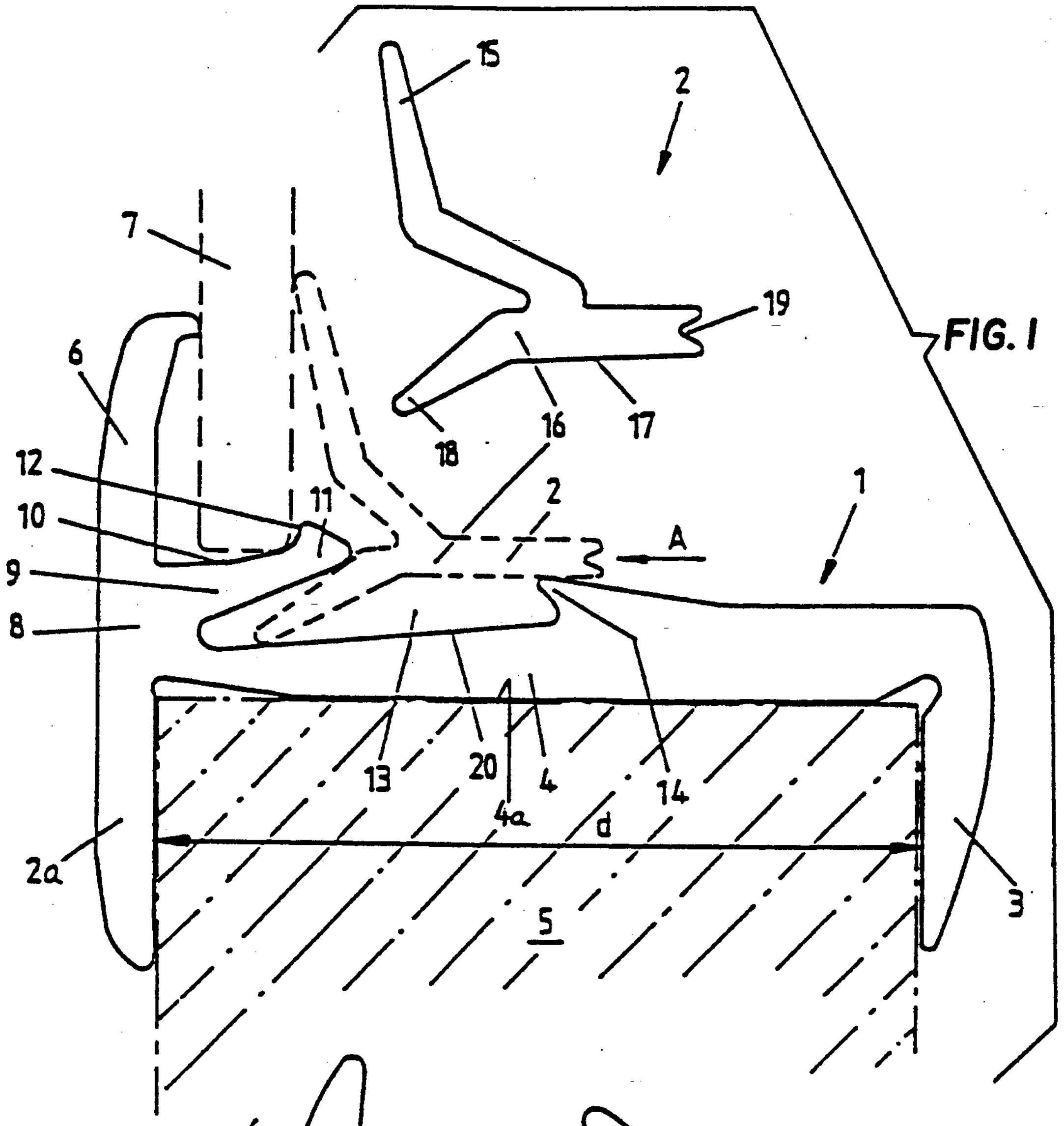

TWO-PIECE SEALING STRIP FOR SEALINGLY FRAMING A WINDOW PANE, OR A PANEL ELEMENT WITHIN A FRAME

FIELD OF THE INVENTION

The invention relates to a two-piece sealing strip made of elastic material for sealingly framing a window pane or a panel element within a frame.

BACKGROUND

Sealing strips of this kind are known in the art; previously only such strips were available on which both sealing lips were attached to a first or main part. One of these lips could easily be bent, thanks to a cutout recess or hollow space provided for in close proximity to that lip. A filler introduced into this cutout, usually a simple body of circular cross section, stiffened this sealing strip again. The mounting of a window pane or a panel became even easier after that sealing lip was attached to the filler itself. Now it was possible to position the pane against the other sealing element whereupon, it was fixed by means of that filler. The filler generally is of the same material as the first or main part, but when the filler still was a simple body, it often was made from metal in order to increase the rigidity of the sealing strip.

Such sealing strips are used, depending upon their dimensions, for small windows in movable elements such as doors or gates. When made correspondingly sturdier, they may also be used for glazings of larger size such as used in tall buildings where substantial loads due to wind pressure may occur.

In this application where substantial wind loads can be expected, it is of substantial importance how the filler and the cutout or recess are shaped. Previously, when the filler was not yet provided with a sealing lip, its design was simple; mostly the cutout or recess was a complete or nearly complete hollow which surrounded the filler practically on its entire periphery. With the sealing lip newly attached to the filler and forming with it a solid connection of considerable thickness in order to achieve the necessary rigidity, this is no longer possible. If, however, the cutout and the filler are given a wrong design, the filler may be tensioned by the pressure of the window pane exerted on its sealing lip to such an extent that it will be squeezed out of the cutout or recess by being elastically deformed. The pane is no longer retained which can result in fatal consequences.

THE INVENTION

It is therefore an object of the invention to form or shape the filler and the main or first part in such a manner that the connection between the two even improves during increasing wind pressure, when compared with that connection achieved immediately after mounting since installation usually is carried out during calm or, at the most, during a gentle breeze. At that time the connection should not yet be exceptionally rigid because otherwise the mounting or dismantling of the window pane may be made more difficult; later on, the connection must be capable of safely retaining the pane even under strong wind gusts and provide for sealing it along its rim.

Briefly, a first, or main part has a body portion which retains a first, that is the outer sealing lip, extending roughly right angle from the body portion. The body portion is framed with a bearing surface adopted to engage against the frame. Opposite at least part of the bearing surface, the body portion is formed with a recess, so that the body portion and the region of the recess becomes more elastic than the remainder. A second part has a base or foot portion which is seeped to fit into the recess of the first part. Inter-engaging projection-and-recess arrangements with the first and second part, respectively, and at both ends of the base or foot portion, ensure that, once the base of foot portion is resiliently inserted into the recess, it will be retained in position. The base or foot portion retains the second sealing lid.

Torques transferred to the two-part sealing strip due to wind loading, and particularly due to wind gusts, which result in unsteady, or dynamic loading on the window pane, or panel tend to compress the body portion, as well as the base or foot portion interlock therewith, so that, even on the high, and changing wind loading, the two-part sealing strip retains its integrity and, is even strengthened by transferring forces to the frame.

DRAWINGS

Figure 2:
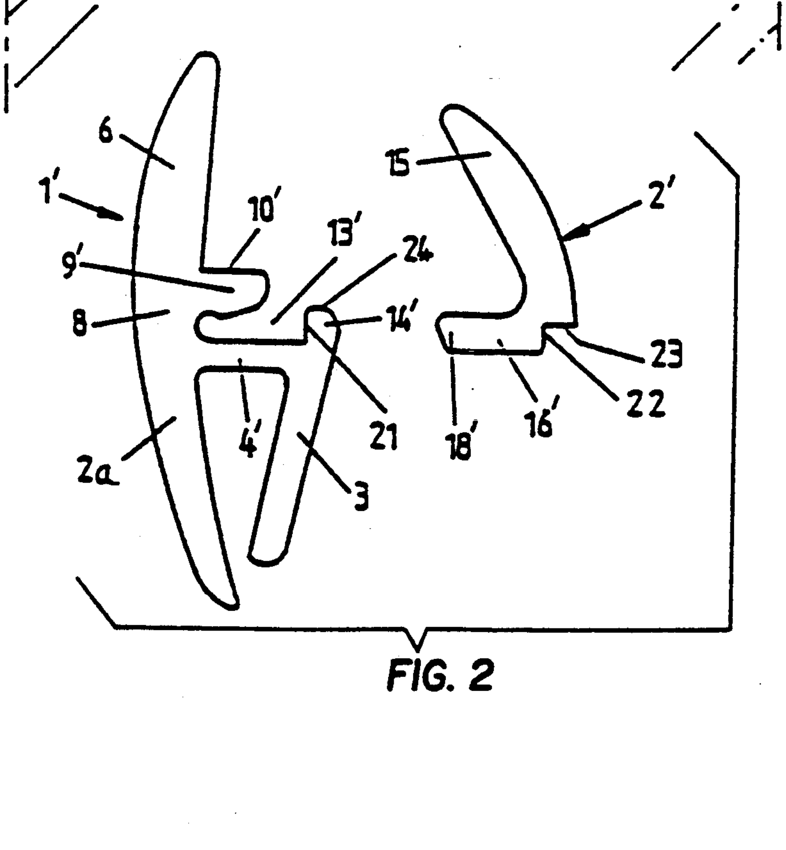

FIG. 1 is a schematic vertical side view of a first embodiment of the sealing strip; and FIG. 2 illustrates another embodiment.

Embodiments of the sealing strip according to the invention will now be described more in detail by referring to the attached drawings, each one of them representing the two parts in an exploded view. Firstly FIG. 1 will be explained.

The sealing strip comprises a first part 1, the main part, and a second part, the filler 2. The main part 1 comprises two holding or securing lips *2a*, 3 extending downwards which are connected to each other by a bridge 4 and form, together with the latter, the sealing strip body. As can be seen, this body embraces a support 5 and engages thereagainst with surface *4a* so that the sealing strip is fixed on it. The distance of the two securing lips from each other, more closely the distance d of their surfaces facing each other and resting against support 5, is selected such with regard to the width of support 5 that said distance d, prior to mounting the sealing strip, is somewhat smaller than the width of support 5. Bridge 4 is therefore widened to a small extent when being placed onto support 5 so that the two securing lips rest against the latter under a certain pressure, effecting in this manner a firm hold of the sealing strip.

Securing lip *2a* an the left of FIG. 1, continues upwardly in a sealing lip 6 whose form practically is a mirror image of that securing lip 6. Sealing lip 6 is intended to rest against a window pane or a filler element 7. Its transition to securing lip *2a* and bridge 4 shall be designated as the foot 8 of that sealing lip. From that foot 8 a further lip 9 extends approximately in the same direction as of bridge 4. However, lip 9 is not parallel to bridge 4 but somewhat inclined upwardly. Its upper side 10 forms the bottom of a groove which will be formed by the interaction of parts 1 and 2 and which takes up the rim of pane 7. At its free end 11 lip 9 carries a protrusion 12, to be discussed later on.

Bridge 4 has on its upper side a wide recess 13, bordered on one end by lip 9 just referred to and on the other end by a rib 14. From this rib 14 to securing lip 3 bridge 4 has its full thickness.

Filler 2 basically is formed of a sealing lip 15 and a very large 6a, 5a or foot 16 which has an angular shape as can be seen from FIG. 1, i.e. its lower side 17 is not continuously straight. Sealing lip 15 is connected to foot 16 about in the middle of the foot 16. Foot 16 is equipped on its left side (in the drawings, FIG. 1 with a tip 18 and on its right side with a groove 19. Groove 19 is formed in such a manner that, when filler 2 is mounted, it is able to surround rib 14 of the main part 1 and which bordes recess 13 so that filler 2 is anchored in part 1.

ASSEMBLY

How this insertion of foot 16 is effected will now be explained. As can be seen in FIG. 1, foot 16 of filler 2 is shown in dashed lines in a position prior to being inserted into recess 13. Prior to that it must be mentioned that its length width, i.e. the distance of tip 18 from groove 19 is at least equal to the length of recess 13, when measured from the transition between bridge 4 and lip 9 up to rib 14. As is obvious from the drawings, when filler 2 is inserted in direction of arrow A, the upper side of its foot 16 contacts already the lower side of free end 11 of lip 9 whereas the right end of the foot is still above rib 14. Continuing the insertion, an elastic upward deflection of lip 9 will now result, bringing the lip into a curved form. This deflection transmits itself first to pane 7 and from the latter to sealing lip 6. Although sealing lip 15 of part 2 presses onto pane 7, the latter is unable to tilt towards the left under the initially lateral pressure because it is clamped on its one side by the tip of sealing lip 6 and by protrusion 12, acting on its rim on the other side. Therefore pane 7 is simply displaced towards the left (FIG. 1) against the pressure of sealing lip 6, deflecting the latter to such an extent that it will become nearly straight. By this steadily increasing counterpressure sealing lip 15 of filler 2 is bent out of its initially slightly curved form into a nearly straight one. This elastic stretching or bending of the two sealing lips results in a sufficient sealing. At this time foot 16 of filler 2 has been displaced so far towards the left that its groove 19 engages into rib 14. The filler is thus anchored.

The pressure of the two sealing lips 6, 15, can be controlled by selecting a material for filler 2 that differs from the one of main part 1. As a rule, however, filler 2 and main part 1 consist of the same material.

Due note should also be taken that, with filler 2 anchored, its lower side 17 does not rest flat onto bottom 20 of recess 13 but presents a distance from it due to its form not being straight. This distance results in a certain additional elasticity not only during mounting and dismantling but also when pane 7 is subjected to pressures e.g. wind loading. Bottom side 17 of part 2 may consist of two straight sections as shown but also may be rounded off, i.e. being concave.

For panes which are subjected to smaller wind pressures either due to their small size or their position, the second embodiment according to FIG. 2 will do. Parts having equal functions are designated with the same reference numerals: if they differ somewhat from their form represented in FIG. 1. Bridge 4' here is substantially shorter because this sealing strip is intended to be mounted onto a frame of reduced width. Sealing lip 6 of part 1, lip 9' and recess 13' are present, too, but recess 13' is substantially shorter. Rib 14' is visible, too, but is less pronounced as in FIG. 1. It is disposed directly above the right securing lip 3 and now presents a vertical stop face 21. As previously, part 2' comprises a sealing lip 15 and a base or foot 16'. However, sealing lip 15 now is located at the very right end of base or foot 16'. The latter is provided with a bearing surface 22 that is vertical, too.

The insertion of part 2' into part 1', after the pane has been placed properly, proceeds the same way as in FIG. 1. Again tip 18' of foot 16' moves underneath lip 9' and is held by the latter so that part 2' cannot tilt in a clockwise direction. What is new is the fact that the two surfaces 21 and 22 contact each other and in this manner form the anchoring means which prevent part 2' to be squeezed out of recess 13' again due to a pressure acting towards the right onto sealing lip 15. The torque, made up from the resultant of the pressure acting onto sealing lip 15 and from the lever arm of that resultant to foot 16' must be taken up in this embodiment to the greater part by lip 9' because sealing lip 15 is located at the right end of foot 16'. In the embodiment of FIG. 1 this torque is distributed about evenly onto lip 9 and groove 19. Nevertheless on the sealing strip according to FIG. 2 the same principle is realized wherein a pressure acting onto sealing lip 15 even improves the connection between parts 1' and 2'; the small rest of the torque not taken up by lip 9' results in a higher pressure of a resting or abutment surface 23 at the lower end of sealing lip 15 onto upper side 24 of rib 14', so that the danger of part 2 sliding out of recess 13 is diminished also at this end.

This sliding out is also diminished in that foot 16' has a sufficient width so that it is capable of taking up the aforementioned torque. This is of particular importance because, as outlined initially, the entire sealing strip is made of elastic material. The latter must be, on one hand, sufficiently hard in order to transmit forces like the pressure originating from pane 7; on the other hand it must still be sufficiently elastic in order not to aggravate, amongst other things, the insertion of part 2 or 2' into recess 13 or 13'. It has proved to be advantageous if the length of foot 16, 16' is at least one half of the length of sealing lip 15, measured from its origin at foot 16, 16' up to its tip or free end. This minimal length is just sufficient on the embodiment according to FIG. 2; on the one according to FIG. 1, on which higher wind pressures must be taken up, the length of the foot 16 should as illustrated, basically correspond to said height so that the lever arm of the torque is great and so that for this reason the forces acting on the ends of the foot remain small.

The sealing strip according to the invention is particularly suitable for panes 7 which are either round, oval or, if rectangular, substantially rounded off at their corners. In these cases the entire sealing strip can be mounted as one piece which surrounds pane 7 entirely and whose ends adjoin each other. It is then impossible, inspite of the easy mounting of filler 2, for unauthorized persons to remove this filler and pane 7 and then become able to open a door or gate from the inside by introducing a tool through a frame which now is empty. When the filler 2, 2'' is inserted and seated so that its end adjoin each other as described, it can removed again only by using a special tool which is at the disposal of the assembling personnel only.

We claim:

1. Two piece sealing strip of elastic material for sealingly framing a window pane (7) or a panel element within the frame (5) comprising a first part (1, 1') having 'a body portion (4, 4');

a first sealing lip (6) extending at least in part approximately at a right angle from said body portion (4, 4'), said body portion being formed with a bearing surface (4a) adapted to engage against said frame (5) and, opposite at least part of said bearing surface, being formed with a recess (13, 14') to render said body portion opposite said recess more elastic than the remainder of the body portion; and a second part (2, 2') having a base or foot portion (16, 16') shaped to fit into said recess (13, 13') of the first part and essentially filling said recess;

a second sealing lip (15) extending at least in part approximately at a right angle from said base or foot portion (16, 16') when assembled with said pane or panel element in said frame; and inter-engaging means (9, 18, 14, 19; 9', 18', 21-24) formed on said foot portion (16, 16') of second part (2, 2') and the body portion (1, 1') at a location where the recess (13, 13') terminates for anchoring the second part (2, 2') within the recess of the first part (1, 1') when said parts are assembled together.

2. The sealing strip of claim 1 wherein said inter-engaging means (9, 18, 14, 19) comprise a groove (19) located at an end region of the foot portion (16), and a rib (14) bordering the recess (13) and fitting within said groove (19).

3. The sealing strip of claim 2 wherein the base of the foot portion (16) defines a rib (18) opposite said groove (19); and the length of the base of foot portion (16) measured from the groove (19) to the opposite end of said tip (18) is equal to the length of said recess (13).

4. The sealing strip of claim 2 wherein the base of the foot portion (16) defines a tip (18) opposite said groove (19); and wherein the body portion (4) at the end of the recess opposite said rib (14) is formed with a cavity dimensioned and shaped to receive said tip to form an inter-engaging projection-and-recess connection.

5. The sealing strip of claim 2 wherein the bottom (20) of the recess is essentially level over the entire length of the recess; and wherein that side (17) of the base or foot portion (16) in engagement with said bottom of the recess (13) has, at least in part, a concave form.

6. The sealing strip of claim 1 wherein the sealing lip (15) of the second part is located approximately in the middle of the base or foot portion and projects laterally therefrom.

7. The sealing strip of claim 1 wherein the second sealing lip (15) is formed with a connecting portion and a sealing lip portion, the connecting portion connecting said sealing lip portion to said base or foot portion (16).

8. The sealing strip of claim 1 wherein said recess (13) of the first part (1) adjacent to said lip (6) includes a projecting lip portion (19), said projecting lip portion having a top side (10) which forms the bottom of a reception groove to receive said window pane (7) or panel; and wherein said reception groove is additionally bordered by said first and second sealing lips (6, 15).

9. The sealing strip of claim 8 wherein said projecting lip (9) is formed with a hook-like protrusion (12) at its free end; and p1 wherein said hook-like protrusion partly borders said pane or panel receiving groove for engaging against and at least partly around said pane or panel (7).

10. The sealing strip of claim 1 wherein the inter-engaging anchoring means comprises a rib (14') formed on said first part (1'), said rib (14') having a vertical stop face (21) and a top side; and a vertical bearing surface (22) formed on the base or foot portion (16') of the second part, and the horizontal resting surface (23) engagable against the top side, said rested surface being located adjacent the end region of the sealing lip (15) adjacent said base or foot portion (16').

11. The sealing strip of claim 10 wherein said first part (10) is formed with lip (9') extending over said recess (13'), said lip (9') being positioned opposite said vertical stop face (21) and bordering said recess (13').

12. The sealing strip of claim 1 wherein said sealing lip (15) of the second part (2') is coupled to the base or foot portion (16') approximately between the center or middle part of the foot portion and its end remote from said first sealing lip (6) of the first part (1').

13. The sealing strip of claim 1 wherein the length of said base or foot portion (16, 16') is at least one half the length of the second sealing lip (15) of the second part (2, 2').

14. The sealing strip of claim 1 wherein said inter-engaging means if formed on said first part (1, 1') and said second part (2, 2') in the vicinity of said first lip (6).

15. The sealing strip of claim 1 wherein two inter-engaging means are provided, the first inter-engaging means being formed on said first part (1, 1') and said second part (2, 2'), respectively, in the vicinity of said first lip (6), and a second inter-engaging means being formed on said first and second parts, respectively, remote from said first lip (6).

16. The sealing strip of claim 1 wherein two inter-engaging means are provided, a first inter-engaging means being formed on said first part (1, 1') and said second part (2, 2'), respectively, in the vicinity of said first lip (6), and a second inter-engaging means being located at that one of the end portions of said recess (13, 13') which is remote from said first lip (6).

17. The sealing strip of claim 16 wherein said inter-engaging means (9, 18, 14, 19; 9', 18', 21-24) comprises a projection-and-recess means.

18. The sealing strip of claim 14 wherein said inter-engaging means (9, 18, 14, 19; 9', 18', 21-24) comprises a projection-and-recess means.

19. The sealing strip of claim 15 wherein said inter-engaging means (9, 18, 14, 19; 9', 18', 21-24) comprises a projection-and-recess means.

20. The sealing strip of claim 16 wherein said first part (1, 1') carries a projection and is also formed with a recess; and said second part (2, 2') is formed with a complementary recess fitting said projection of said first part and is further formed with a cavity or recess to receive said projection of said first part.

* * * * *